United States Patent [19]

Elassar

[11] Patent Number: 4,658,462
[45] Date of Patent: Apr. 21, 1987

[54] OIL RESERVOIR DIPSTICK WIPER

[76] Inventor: Marcel Elassar, 64 Marinus St., Rochelle Park, N.J. 07662

[21] Appl. No.: 838,911

[22] Filed: Mar. 12, 1986

[51] Int. Cl.$^4$ ............................................. F01M 11/12
[52] U.S. Cl. ................................................. 15/210 B
[58] Field of Search .............. 15/210 B, 256.6, 210 R, 15/218.1

[56] References Cited

U.S. PATENT DOCUMENTS

| | | | |
|---|---|---|---|
| 1,102,965 | 7/1914 | Smith | 15/210 B X |
| 4,233,704 | 11/1980 | Sartorio | 15/210 B |
| 4,506,402 | 3/1985 | Long, Jr. | 15/210 B |

FOREIGN PATENT DOCUMENTS 551688  10/1956  Belgium ............................ 15/210 B Primary Examiner—Edward L. Roberts

[57] ABSTRACT

A device adapted for cleaning a dipstick as it is drawn through the device. The device includes a cylindrical housing having opposed wipers mounted in the housing for selectively contacting the dipstick. A mounting strap and strap lock are provided on the surface of the cylindrical housing.

1 Claim, 5 Drawing Figures

OIL RESERVOIR DIPSTICK WIPER

BACKGROUND OF THE INVENTION

This device and the following implementation of it is devised so that now a vehicle's oil dipstick can be cleaned right at the engine compartment. Its main purpose is its time saving advantage. This item will eliminate the need to go to a storage area of the vehicle, find a towel or rag suitable to wipe the dipstick, then go back to the engine again, wipe the dipstick clean and finally insert the dipstick into the oil reservoir to check the reservoir oil level, returning to the vehicle's storage area again to store the towel or rag, for future use.

Accordingly a need exists for a devise which will eliminate the wasted time in finding and retrieving something suitable to wipe the oil dipstick clean.

This invention mounted in the engine compartment, will fill that need, and checking reservoir oil levels will be quicker, and somewhat easier in the process.

SUMMARY OF THE INVENTION

In accordance with the invention claimed a new device is provided for wiping clean the dipstick used in checking a vehicle's oil level. By this invention a pliers type blade grip attachment is mounted within a hollow cylindrical assembly. These blade grips are each provided with a resilient blade at their tip for gripping the oil dipstick after its insertion into the cylindrical assembly, whereas upon squeezing of the blade grips at their handles, the resilient blades are compressed around the dipstick. Therefore with pressure being maintained on the blade grip handles as the dipstick is withdrawn from the cylindrical assembly the dipstick is wiped clean, so that it now can be reinserted into the vehicles oil reservoir to verify the reservoirs present oil level.

This invention comprises an attaching strap for its installation. By strapping this invention to the vehicle's chassis, hood, or any suitable large diameter hose or other secure mounting point within the vehicle's engine compartment and securing it with the strap lock, a durable and handy item will be convieniently located and ready for use, eliminating the need for using a towel or rag to wipe the vehicle's oil reservoir dipstick clean before checking the vehicles oil level.

DESCRIPTION OF THE PRIOR ART

No patents or structures are known which comprise a device for cleaning a reservoirs oil dipstick.

BRIEF DESCRIPTION OF THE DRAWINGS

Referring now to the drawings wherein like numerals refer to like parts throughout the several views.

DESCRIPTION OF THE PREFERRED EMBODIMENT

Figure 1:
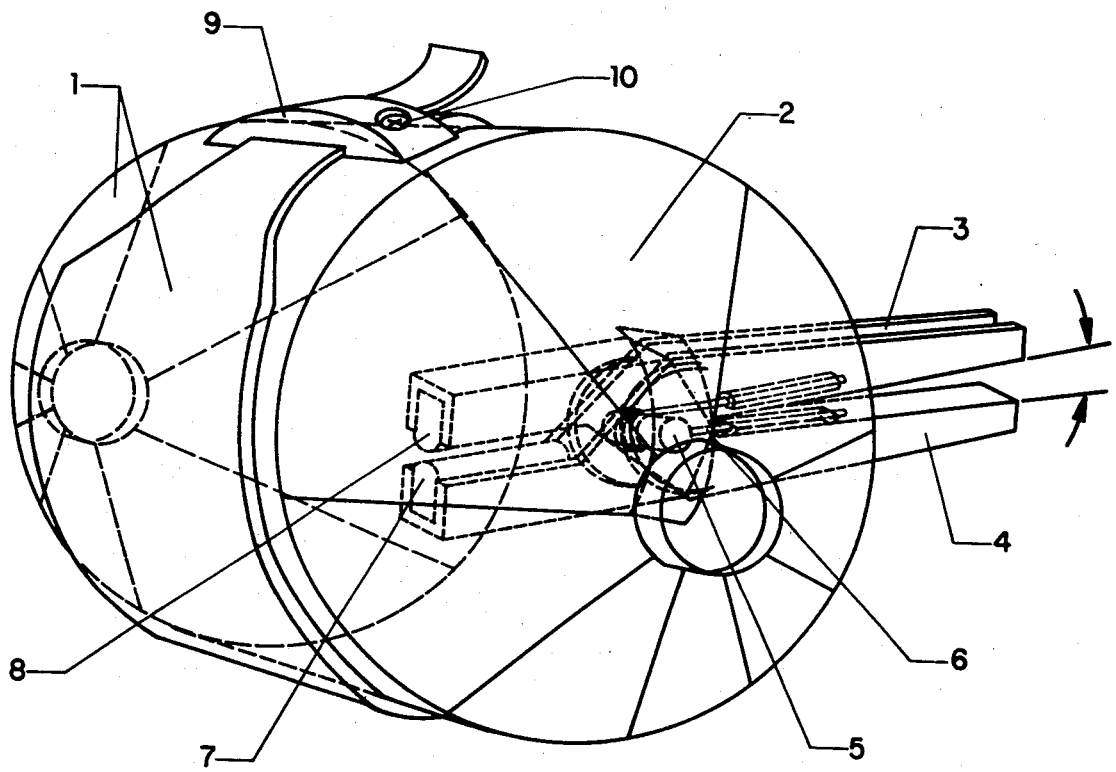
FIG. 1 is a perspective view of the complete assembly. The blade grips 3 and 4 are shown in their compressed position. The security strap attachment 1 is shown in its locked down position.
Figure 2:
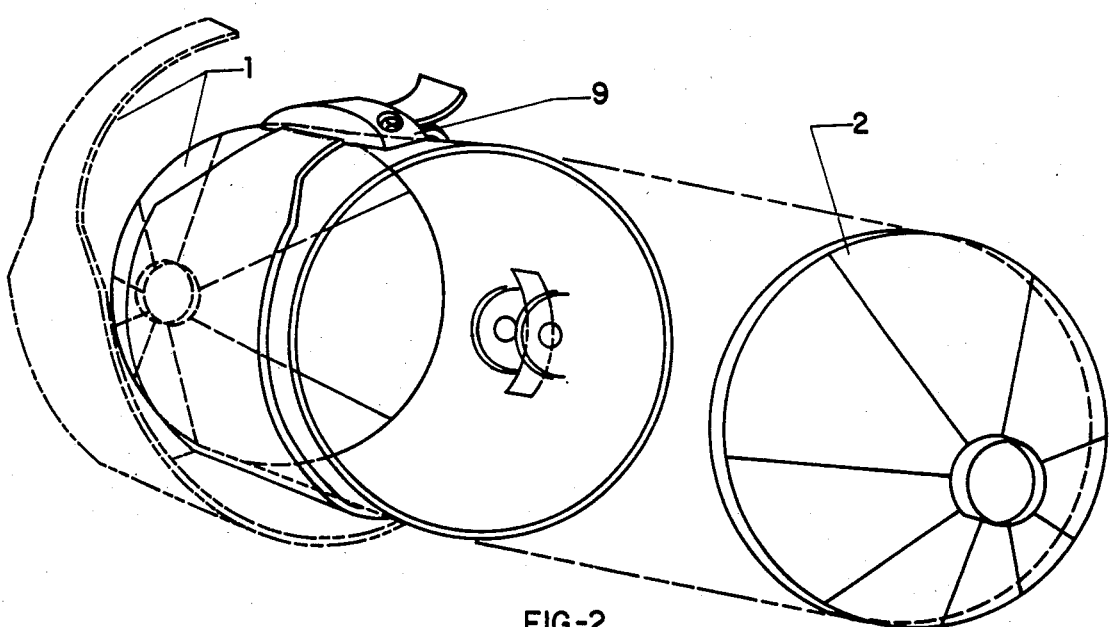
FIG. 2 is an exploded perspective view of the hollow cylindrical assembly and strap attachment 1.

Referring to the drawings in detail it will be seen that the embodiment of the invention which has been illustrated comprises a hollow cylindrical assembly 1 forming a cone at one end, and an identical cone cap 2 at the opposite end, each end having a small opening for receiving a vehicles oil dipstick. The cone cap 2 is removable, as illustrated in FIG. 2, to facilitate both assembly and periodic cleaning of the inner portion of the cylindrical assembly 1. The vehicles oil dipstick will be inserted first, through the opening in the cone cap 1 or 2, and will exit through the other opening at the end of the cylindrical assembly.

Figure 4:
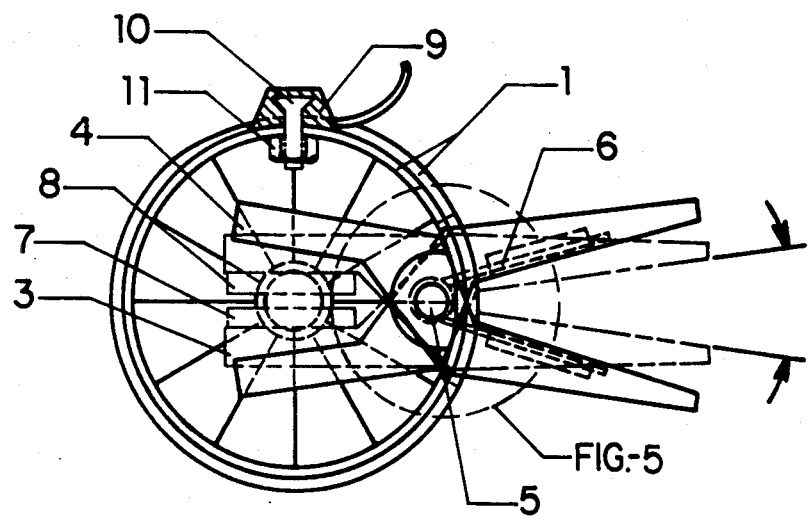
FIG. 4 is a sectional view of FIG. 3 taken along the line 12—12.
Figure 5:
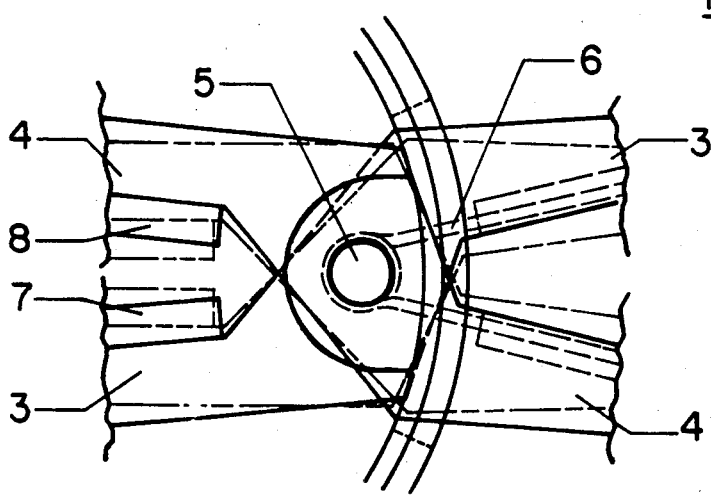
FIG. 5 is a detail of FIG. 4.

The cylindrical assembly encompasses the blade grips 3 and 4 which pivot in a pliers like fashion on a hinge 5 which is attached to the interior of the cylindrical assembly 1. The blade grips 3 and 4 are yieldingly urged to an open position illustrated in FIG. 4 by a spring 6 having a portion of the spring 6 coiled around the hinge 5 and having both ends of the spring 6 inserted through slots provided in the handles of the blade grips 3 and 4 as illustrated in FIG. 5, yieldingly urging the jaw elements of the blade grips 3 and 4 to an open position.

Upon insertion of the vehicle's oil dipstick the blade grips 3 and 4 are to be squeezed by hand at their handles, pivoting the attached resilient blades 7 and 8 together around the inserted dipstick, thus, as pressure is maintained on the blade grip handles 3 and 4 and the dipstick is withdrawn from the cylindrical assembly the dipstick is wiped clean of any oily residue. Upon releasing the handles of the blade grips 3 and 4 the spring 6 attached to the blade grips re-opens the jaw elements of the blade grips 3 and 4 to their original positions as illustrated in FIG. 4.

Figure 3:
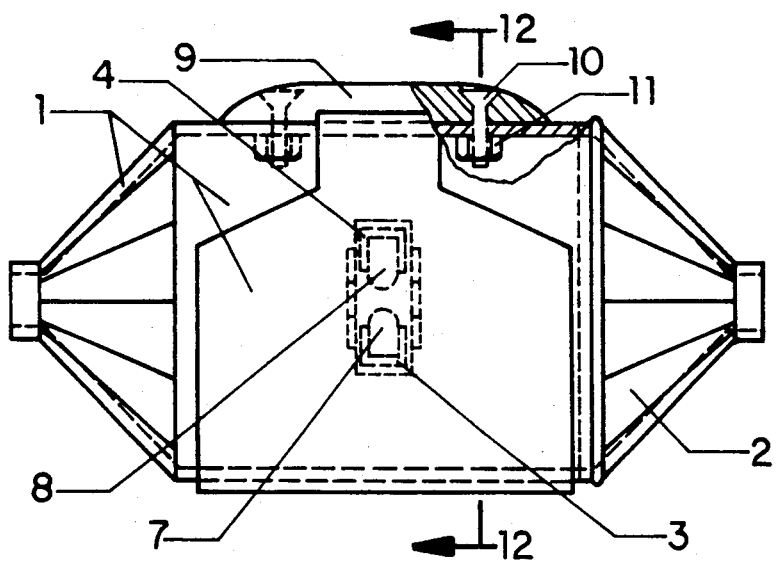
FIG. 3 is an elevation view, including a brokenout section view detailing the strap lock 9 that secures the strap in place. The blade grips 3 and 4 are shown in a compressed position.

The security strap 1 which is a part of the hollow cylindrical assembly 1 is illustrated in FIG. 2 in both a locked down and an unlocked position. A phantom line is used to illustrate the strap's flexibility and excess length required to wrap the strap around a selected mounting point. The excess length of the strap can be cut off when determined no longer needed. For installation the cylindrical assembly will be strapped to a suitable portion of the vehicle's chassis, hood, engine, firewall, or any suitable large diameter hose located in the engine compartment, the strap being wrapped first, around the hollow cylindrical assembly 1, and then its selected mounting point, and finally secured by inserting the strap under the strap lock 9 and the strap lock 9 torqued down over the strap by two threaded screws 10 and two threaded nuts 11 as illustrated in FIG. 3 and FIG. 4, the head of the screw 10 being provided with a screwdriver slot to permit turning of the screw 10 as may be desired in either removal or installation of the strap lock 9.

This invention will be built of suitable plastic with the hinge pin 5 and the spring 6 made of metal for added durability. This invention will provide a clean contamination free cylinder for wiping a vehicle's oil reservoir dipstick clean, and being both easily accessible and convieniently located this invention will make checking a vehicle's oil level quicker and easier in the process.

It will also be apparent to those skilled in the art that changes and other modifications may be made to the device shown and described herein without departing from the spirit of the invention or from the scope of the appended claims.

What is claimed is:

1. A device for cleaning reservoir oil dipsticks on vehicles and machinery which require oil levels to be verified and maintained regularly by means of an oil dipstick, the device comprising:
   a hollow cylindrical member having an end cap at each end thereof, one of said end caps being detachably mounted on said cylindrical member, an opening in each end cap providing means for inserting a dipstick through said cylindrical member,
   a pair of resilient blades mounted in said cylindrical member, first means for supporting and moving said resilient blades from a first position in which the dipstick can be passed therebetween without contacting said blades to a second position in which said blades will contact and wipe the dipstick as it is passed therebetween, said first means comprising first end portions supporting said blades and second end portions providing means for moving said blades,
   second means pivotally mounting said first means on the interior surface of the cylindrical member for movement between said first and second positions, said second means supporting said first means between the first and second end portions,
   third means for biasing said blades toward said first position,
   fourth means for mounting said cylindrical member on a supporting surface, said fourth means comprising a flexible strap fixed at one end thereof to said cylindrical member, a strap lock means fixedly mounted on said cylindrical member, a second end of said strap adapted to be adjustably secured to said strap lock means, and the openings in said end caps and the position of said blades being positioned such that the dipstick can be inserted from either end of the device for cleaning.

* * * * *